(12) United States Patent
Yahashi et al.

(10) Patent No.: US 6,297,881 B1
(45) Date of Patent: Oct. 2, 2001

(54) THREE-DIMENSIONAL MEASUREMENT METHOD AND THREE-DIMENSIONAL MEASUREMENT DEVICE

(75) Inventors: Akira Yahashi, Kobe; Toshio Norita, Osaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/520,887

(22) Filed: Apr. 5, 2000

(30) Foreign Application Priority Data

Apr. 8, 1999 (JP) .................................................. 11-100866

(51) Int. Cl.[7] .............................. G01B 11/14; G01B 11/24

(52) U.S. Cl. ........................... 356/375; 356/376; 356/380; 250/332; 250/334

(58) Field of Search ..................................... 356/375, 376, 356/380, 387; 250/332, 334

(56) References Cited

U.S. PATENT DOCUMENTS 5,416,591 * 5/1995 Yoshimura et al. .................. 356/387

* cited by examiner

*Primary Examiner*—Frank G. Font
*Assistant Examiner*—Roy M. Punnoose

(57) ABSTRACT

The purpose of the three-dimensional measurement method and device is to reduce occlusion while ensuring a predetermined resolution, and increase resolution without increasing occlusion. In a three-dimensional input device provided with a projection device for projecting a reference light U from an starting point A toward an object Q, and an image sensing device for receiving the reference light reflected by the object Q at a position B separated from the starting point A in the baseline direction, and the object Q illuminated by the reference light U is sensed and data specifying the position of the object are output, an anamorphic lens 51 is provided for forming an image having a magnification in the baseline direction larger than the magnification in a direction perpendicular to the baseline direction on the photoreceptive surface S2 of an opto-electric conversion device.

12 Claims, 11 Drawing Sheets

FIG. 4A
FIG. 4B
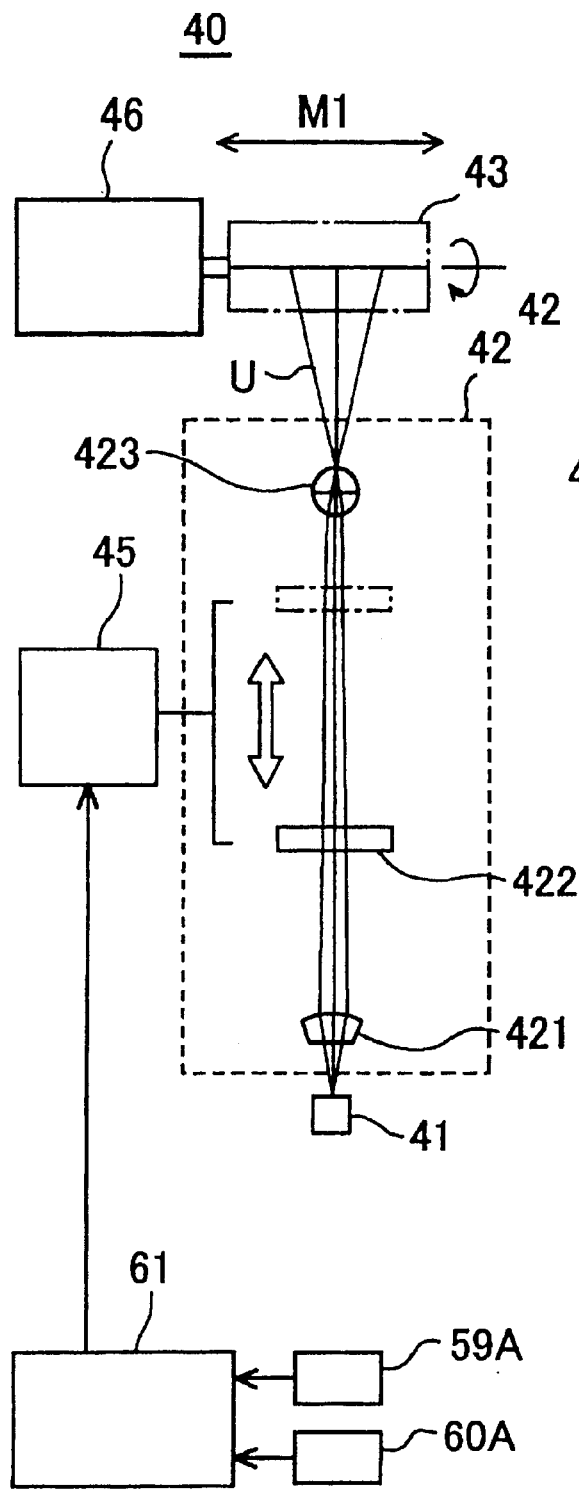
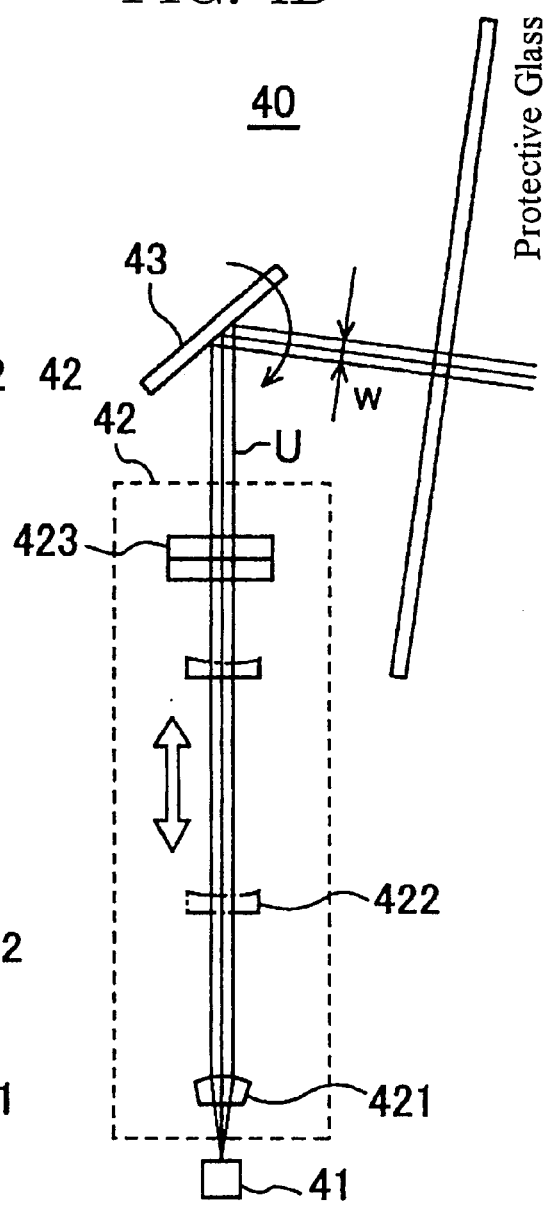

(a)

(b)

(c)

THREE-DIMENSIONAL MEASUREMENT METHOD AND THREE-DIMENSIONAL MEASUREMENT DEVICE

This application is based on application No. Hei 11-100866 filed in Japan, the content of which is hereby incorporated by reference.

BACKGROUND OF THE INVENTION

1. Field of the Invention

The present invention relates to an optical type three-dimensional measurement method and a three-dimensional measurement device for obtaining measurement data or data based on measurement data.

2. Description of the Related Art

Three-dimensional measurement devices of the non-contact type are used for data input to computer graphics (CG) systems and CAD systems, three-dimensional measurements, and robotic visual recognition because of their high-speed measurement capability compared to devices of the contact-type.

Active methods for projecting reference light such as the slit projection method (also known as the light-sectioning method), spatial pattern encoding method, and striped pattern projection method are generally used as the measuring methods in portable three-dimensional measurement devices. Some devices also use the passive type stereo view method. For example, the slit projection method uses a slit light having a beam cross-section in the form of a linear band as a reference light, and scans in line sequence by deflecting the beam in the slit width direction. The slit length direction is the main scan direction, and the width direction is the subscan direction. Part of an object is illuminated at a point in time during scanning, and a bright line curved in accordance with the shape of the illuminated part appears on the photoreceptive surface of the image sensing system. Accordingly, a group od three-dimensional data which identify the object shape or the distances to various positions on the object is obtained by periodically sampling the brightness of each pixel of the photoreceptive surface during the scan.

In three-dimensional measurement via an active triangulation method, only the shape within a range of an object illuminated by a reference light and projected on the photoreceptive surface can be measured. Shadow areas on the photoreceptive surface cannot be measured even when illuminated by reference light. That is, a so-called occlusion is disadvantageously generated. To suppress the generation of occlusion, the baseline length of triangulation (i.e., the length of the line connecting the starting point of the projection light and the point of the received light) may be reduced to bring the principal point of the received light near the starting point of the projection light. However, this reduces resolution in the measurement depth direction, i.e., the distance direction. Even in the case of stereo view methods, resolution is reduced if the distance between the image sensing positions of two locations, i.e., the baseline length, is shortened.

When the frontal shape of an object is long and narrow, and the depth dimension is small, the majority of the photoreceptive surface is a region which does not receive the projection of the object image, thereby greatly reducing the efficiency of the photoreceptive surface. It is desirable that the projected object image is larger than the photoreceptive surface from the perspectives of measurement accuracy and reduction of unnecessary data.

SUMMARY OF THE INVENTION

An object of the present invention is to provide a three-dimensional measurement method and device capable of ensuring a specific resolution while reducing occlusion or not increasing occlusion.

These objects are attained by the measurement method of the present invention which is a three-dimensional measurement method for measuring position of an object, comprising following steps of: forming an image of the object on a sensor by an anamorphic lens to have a magnification of the image in a direction along the baseline of triangulation greater than a magnification of the image in another direction; different from the direction along the baseline of triangulation and measuring position of the object by triangulating in accordance with data obtained by the sensor.

The three-dimensional measurement device of the present invention comprises a projector for projecting reference light from a starting point to an object; a sensor for receiving the reference light reflected by the object at a position separated from the starting point in a baseline direction; and an anamorphic lens system for forming an image on a photoreceptive surface of the sensor, wherein the image having greater magnification in the baseline direction than in another direction; and data output device for outputting data identifying a position of the object in accordance with data related to the object obtained from the sensor output.

BRIEF DESCRIPTION OF THE DRAWINGS

These and other objects and features of this invention will become dear from the following description, taken in conjunction with the preferred embodiments with reference to the accompanied drawings in which:

FIGS. 4A and 4B are structural views of the projection lens;

DETAILED DESCRIPTION OF THE PREFERRED EMBODIMENTS

Figure 1:
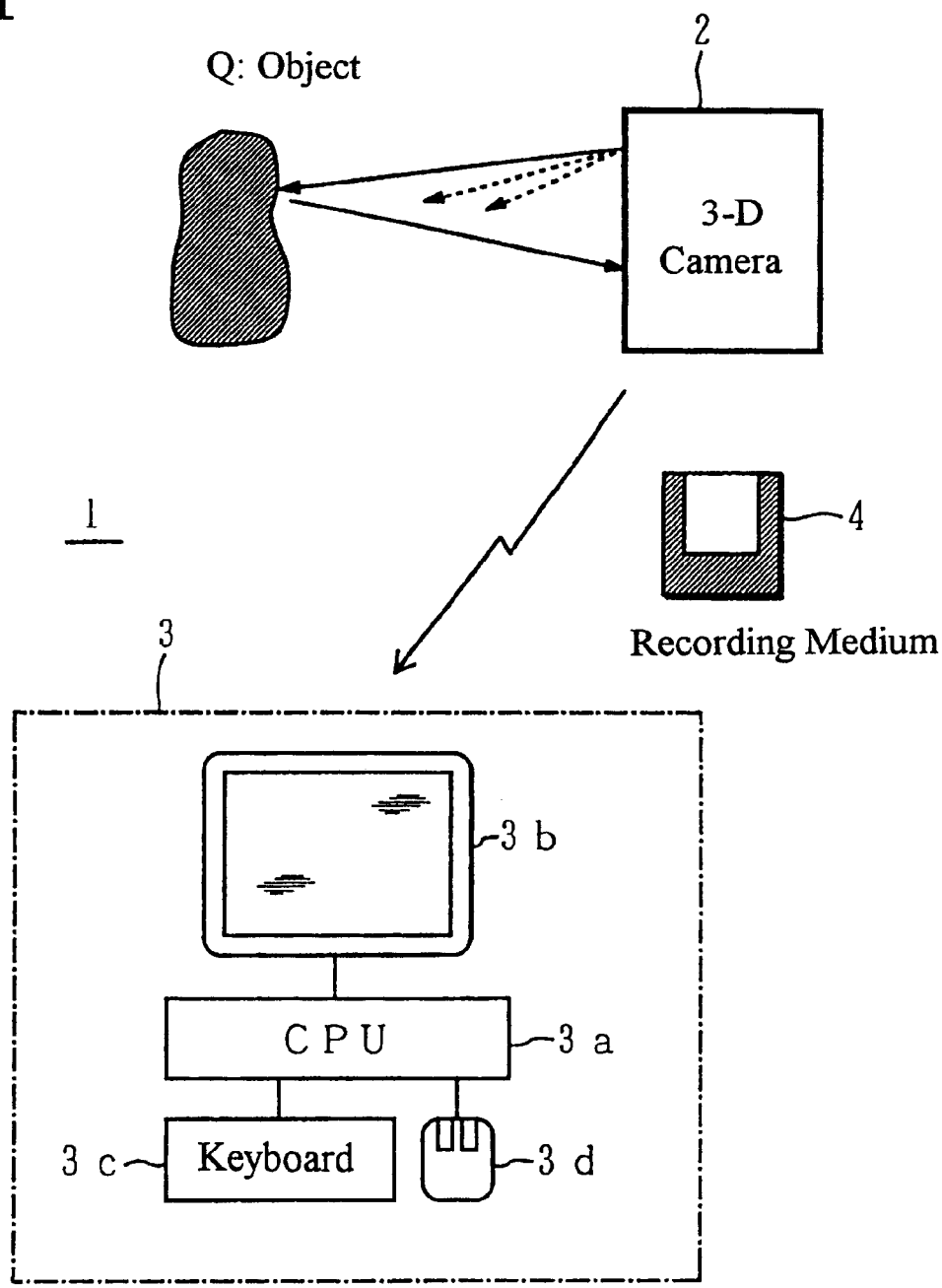
FIG. 1 is a structural view of an embodiment of the measurement system.

FIG. 1 is a structural view of the measurement system of an embodiment of the present invention.

The measurement system 1 comprises a th dimensional camera 2 for measuring a solid body via the slit light projection method, and a host 3 for processing the data output from the three-dimensional camera 2.

The three-dimensional camera 2 outputs measurement data speckling the three-dimensional positions of sampling points on an object Q which is the measurement target, and data required for calibration and a two-dimensional image representing the color information of the object Q. The host 3 performs calculation processing for determining the coordinates of the sampling points using a triangulation method.

The host 3 is a computer system comprising a CPU 3a, display 3b, keyboard 3c, and mouse 3d. The CPU 3a holds software for processing the measurement data. Two kind of data transfers including offline data transfer via a portable recording medium 4 and online data transfer, for example, via cable or infrared communications are possible between the host 3 and the three-dimensional camera 2. The recording medium 4 may be a magneto-optical disk (MO), minidisk (MD), memory card or the like.

Figure 2A:
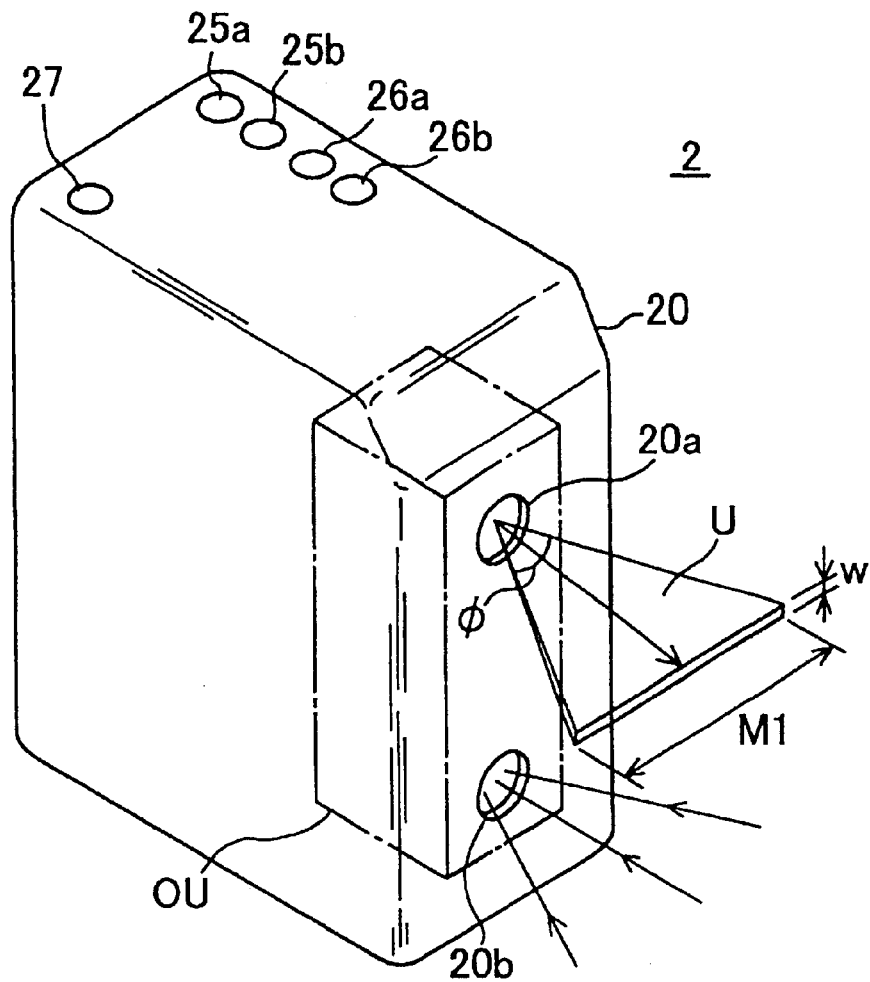
FIGS. 2A and 2B are exterior views of a three-dimensional camera.
Figure 2B:
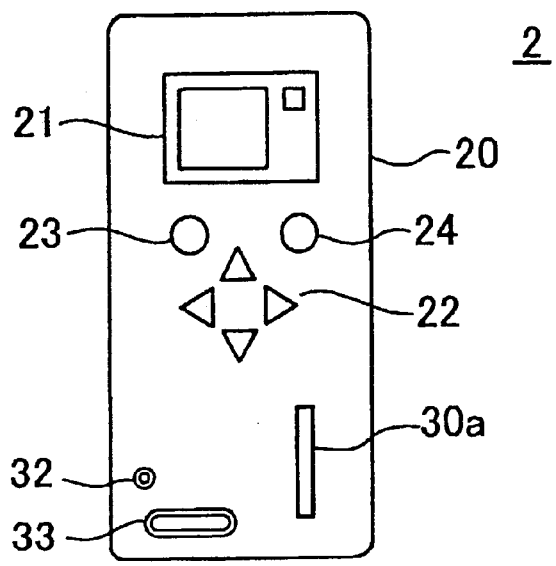

FIGS. 2A and 2B show exterior views of a three-dimensional camera.

A projection window 20a and reception window 20b are provided on the front of a housing 20. The projection window 20a is positioned on the top side relative to the reception window 20b. The slit light U emitted from the optical unit OU within the housing is a band-like laser beam having a specific width w, and is directed through the projection window 20a toward the object which is the measurement target. The slit light U has a fixed emission angle (in the length direction M1. Part of the slit light U reflected by the surface of the object enters the optical unit OU through the reception window 20b. The optical unit OU is provided with a dual-axis adjustment mechanism for optimizing the relative relationship between the projection axis and the reception axis.

Zoom buttons 25a and 25b, manual focus buttons 26a and 26b, and a shutter button 27 are provided on the top of the housing 20. As shown in FIG. 2B, on the back of the housing 20 are provided a liquid crystal display 21, cursor buttons 22, selection button 23, cancel button 24, analog output terminal 32, digital output terminal 33, and recording media loading port 30a.

The liquid crystal display (LCD) 21 is used as an operation screen display means and electronic viewfinder. A photographer may set the photographic mode by the various buttons 21~24 on the back of the housing. Color image signals, e.g., in NTSC format, are output from the analog output terminal 32. The digital output terminal 33 is, for example, a SCSI terminal.

An user (photographer) sets a desired operation mode in accordance with guidance on the operation screen displayed on the LCD 21. Thereafter, the position and direction of the camera is determined and the view angle set while viewing the color monitor image. Then, a zoom operation is performed as necessary.

Figure 3:
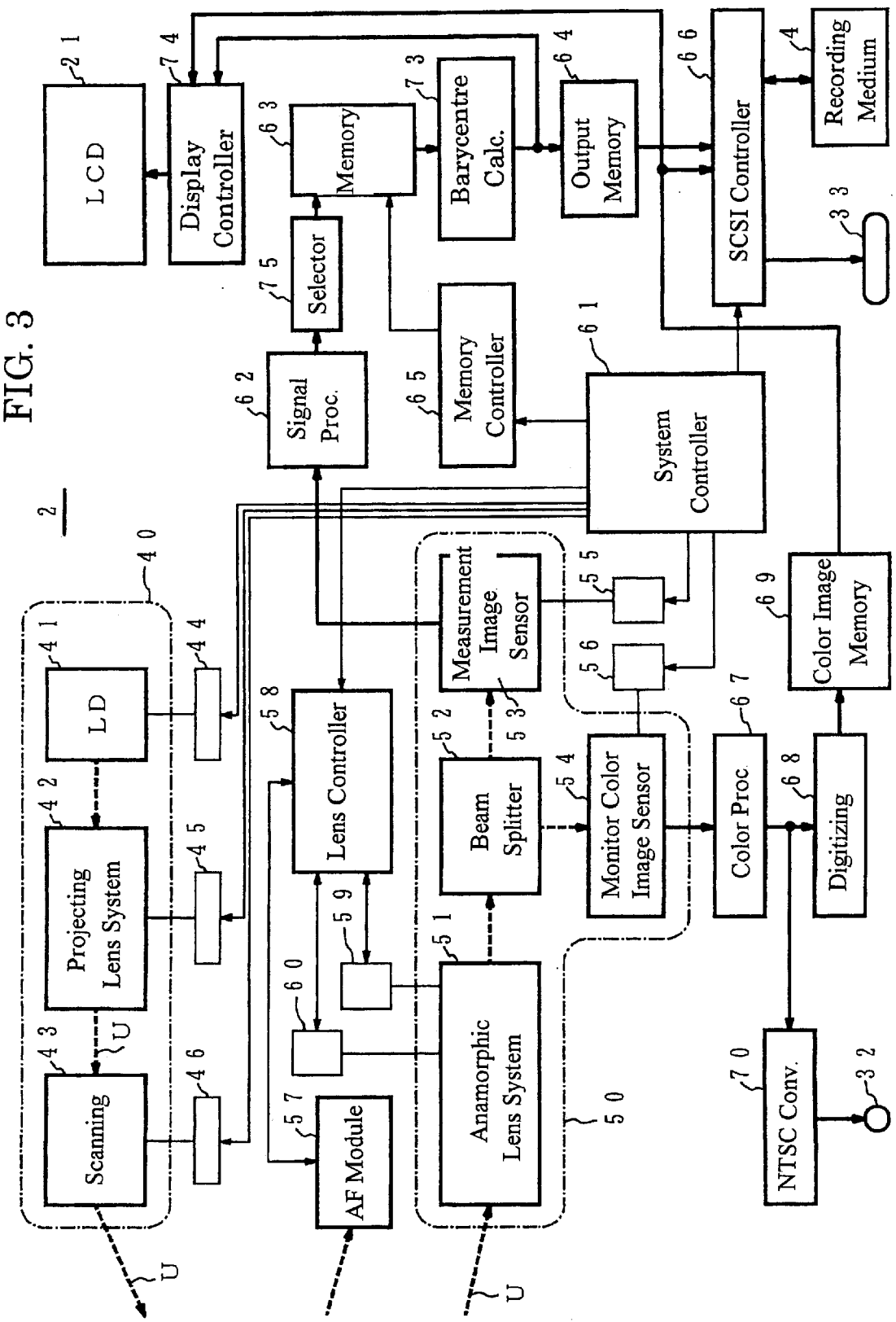
FIG. 3 is a block diagram showing the functional structure of the three-dimensional camera.

FIG. 3 is a block diagram showing the functional structure of a three-dimensional camera. The solid arrows in the drawing represent the flow of the electronic signals, and the dashed arrows represent the flow of light.

The three-dimensional camera 2 has a projection optical system 40 comprising the previously mentioned optical unit OU, and a photographic system 50.

In the projection optical system 40, a laser beam of wavelength 685 nm emitted from a semiconductor laser (LD) 41 passes through the projection lens system 42 and becomes the slit light U, which is deflected by a galvano mirror (scan means) 43. A system controller 61 controls the driver 44 of the semiconductor laser 41, drive system 45 of the projection lens system 42, and the drive system 46 of the galvano mirror 43.

In the photographic system 50, the light condensed by the anamorphic taking lens system 51 which is an aspect of the present embodiment is split by a beam splitter 52. The light in the oscillation wavelength range of the semiconductor laser 41 enters a measurement image sensor 53. The light in the visible range enters a monitor color image sensor 54. The image sensor 53 and the color image sensor 54 are both CCD imaging devices. An auto-focusing (AF) module 57 for optical measurement is arranged near the anamorphic taking system lens 51 to accomplish autofocusing of the anamorphic taking system lens 51. A lens controller 58 controls the focus drive system 59 based on the distance data output from the AF module 57. A zoom drive system 60 is provided for electromotive zooming.

The flow of object information in the three-dimensional camera 2 is described below.

First, photographic information obtained by the image sensor 53 is transmitted to a signal processing circuit 62 synchronously with a clock signal from the driver 55. The signal processing circuit 62 has an amplifier for amplifying the photoelectric conversion signals of each pixel output from the image sensor 53, and an AD converter for converting the photoelectric signals to 8-bit photoreception data. After the photoreception data obtained by the signal processing circuit 62 are temporarily stored in a memory 63, the data are transmitted to a barycentre calculation circuit 73. At this time, the addressing is controlled by the memory controller 65. The barycentre calculation circuit 73 calculates the basic data for calculating the three-dimensional position based on the input photoreception data, and outputs these data to an output memory 64. The barycentre calculation circuit 73 generates a density image (distance image) corresponding to the shape of the object which is the measurement target, and this image is transmitted to a display controller 74. The LCD 21 displays the density image, color image, operation guidance screens and the like. The system controller 61 issues specifications for displaying suitable letters and symbols or the like on the LCD screen 21 relative to character generator not shown in the drawing.

On the other hand, the photographic image obtained by the color image sensor 54 is transmitted to the color processing circuit 67 synchronously with a clock signal from the driver 56. The color-processed photographic information is output online through the NTSC conversion circuit 70 and analog output terminal 32, or is quantified by the digitizing circuit 68 and temporarily stored in a color image memory 69. Thereafter, the color image data are transferred from the color image memory 69 to the SCSI controller 66, and output online from the digital output terminal 33, or stored on recording medium 4 with the corresponding measurement data.

The color image is an image at the same view angle as the distance image obtained by the image sensor 53, and is used as reference information for application processing by the host 3. For example, a process for generating a shape model by combining measurement data of a plurality of groups having different camera viewpoints, or a process for culling unnecessary peaks from a shape model may be used as the process using the color image.

FIGS. 4A and 4B are structural views of the projection lens system. FIG. 4A is a front view, and FIG. 4B is a side view.

The projection lens system 42 comprises three lenses including a collimator lens 421, variator lens 422, and expander lens 423. The laser beam emitted from the semiconductor laser 41 is optically processed to obtain a suitable slit light U in the following sequence. First, the beam is slightly collimated inward by the collimator lens 421. Then, the beam diameter is adjusted by the variator lens 422. Finally, the beam is bent in the slit length direction Ml by the expander lens 423.

The variator lens 422 is provided to introduce the slit light U having a width of several pixels into the image sensor 53 regardless of the measuring distance and view angle. The drive system 45 moves the variator lens 422 so as to maintain a constant width w of the slit light U on the image sensor 53 in accordance with an instruction from the system controller 61. The variator lens 422 moves in conjunction with the zoom lens 514, 515 of the photoreception optical system.

Distortion of the slit light U can be reduced by extending the slit length before deflection by the galvano mirror 43, compared to doing so after deflection. The galvano mirror 43 can be made compact by positioning the expander lens 423 in the final stage of the projection lens system 42, i.e., near the galvano mirror 43.

Figure 5:
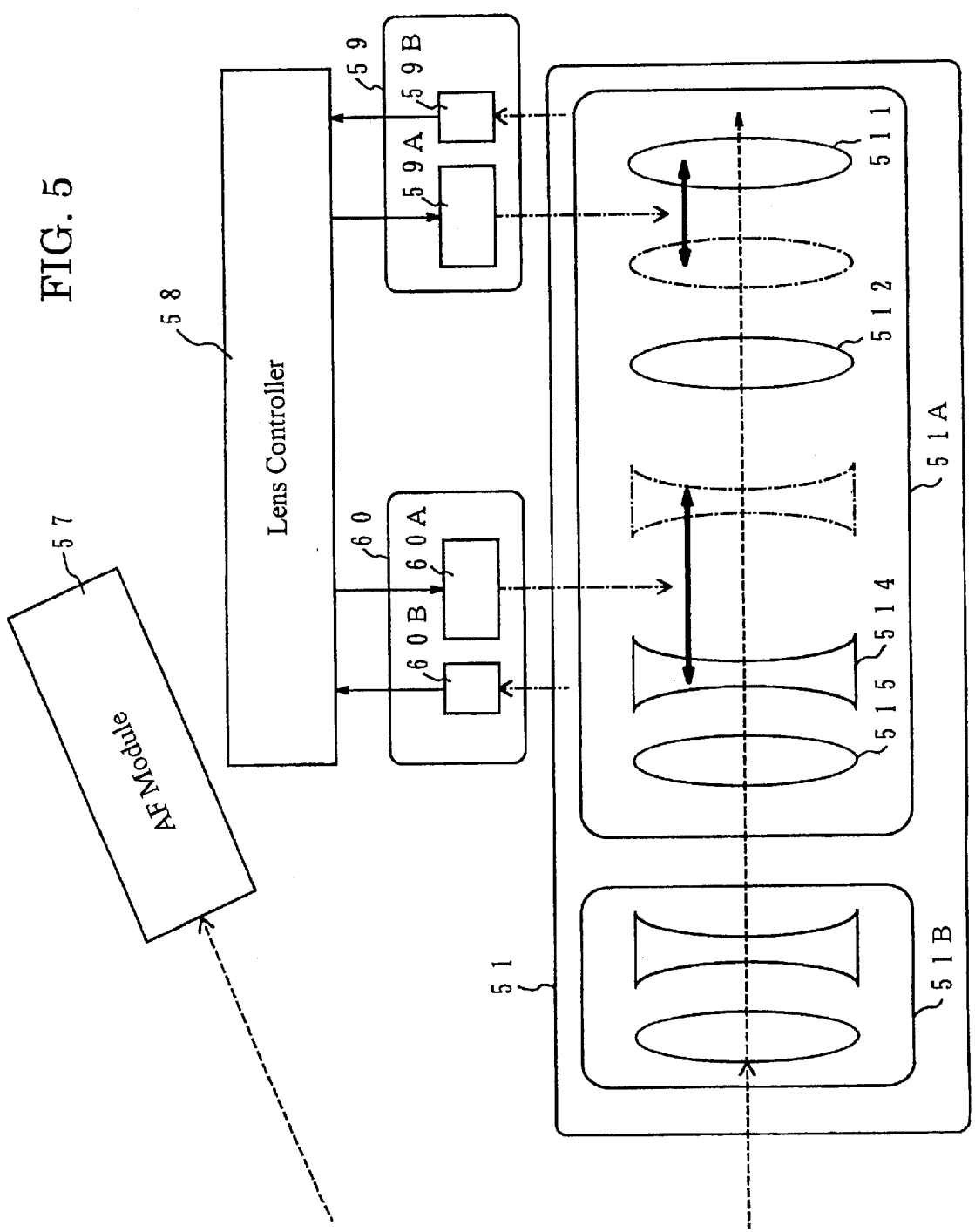
FIG. 5 is a structural view of the anamorphic system.

FIG. 5 shows the structure of the anamorphic taking lens system.

The anamorphic taking system lens 51 comprises a zoomable image forming unit 51A, and an afocal-type anamorphic lens unit 51B. The image forming unit 51A comprises a front fixed lens 515, variator lens 514, focusing lens 511, and rear fixed lens 512. The variator lens 514 and focusing lens 511 are mutually and independently movable along the optical axis.

Figure 11:
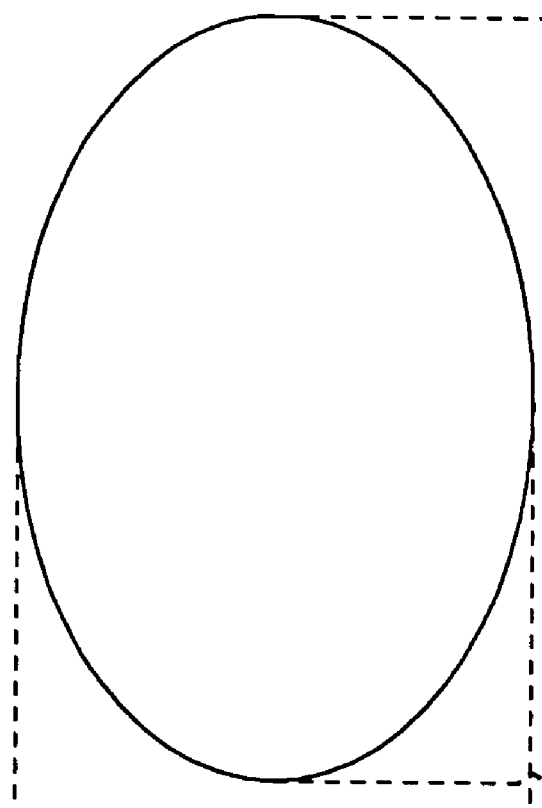
FIG. 11 shows an example of an anamorphic lens.
Figure 11:
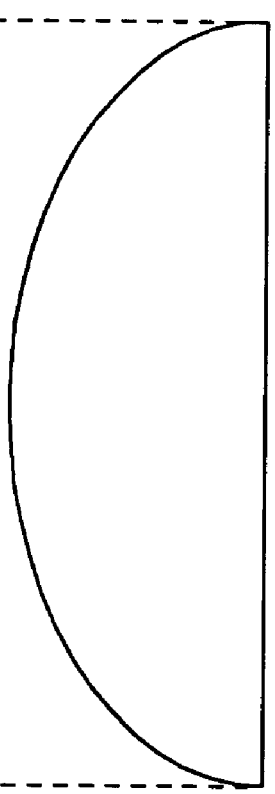
Figure 11:
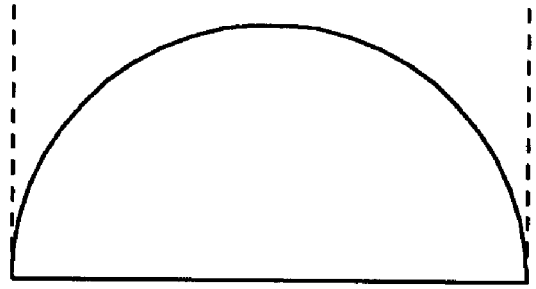

The movement of the focusing lens 511 is accomplished by the focus drive system 59. The focus drive system 59 is provided with a pulse motor 59A for driving the lens, and a start point switch 59B for detecting the starting point position. The focusing lens 511 moves only a distance corresponding to the number of rotations of the pulse motor 59A using the start point switch 59B operation point as a reference. The movement of the variator lens 514 is accomplished by the zoom drive system 60. The zoom drive system 60 is provided with a pulse motor 60A for driving the lens, and a start point switch 60B for detecting the starting point position. The variator lens 514 moves only a distance corresponding to the number of rotations of the pulse motor 60A using the start point switch 60B operation point as a reference. The anamorphic lens 51B is arranged to match the optical axis on the front side of the image forming unit 51A. Furthermore, the magnification in the baseline direction is greater than the magnification in a direction perpendicular to the baseline direction. In the example of an anamorphic lens shown in FIG. 11, the provided surfaces are a surface having a large curvature in the baseline direction (vertical direction in the drawing, as shown in (a) and (b)) and a curvature smaller than the aforesaid curvature in a direction perpendicular to the baseline direction as shown in (a) and (c), and another surface which is flat. The lens has different optical power in the baseline direction and a direction perpendicular to the baseline direction via the provision of these surfaces. When the lens is constructed of a plurality of lens elements as in the anamorphic lens 51B of FIG. 5, one of the surfaces may be as shown in FIG. 11, or a plurality of lens elements and surfaces may be used such that, in total, they are equivalent to the anamorphic lens.

Figure 6:
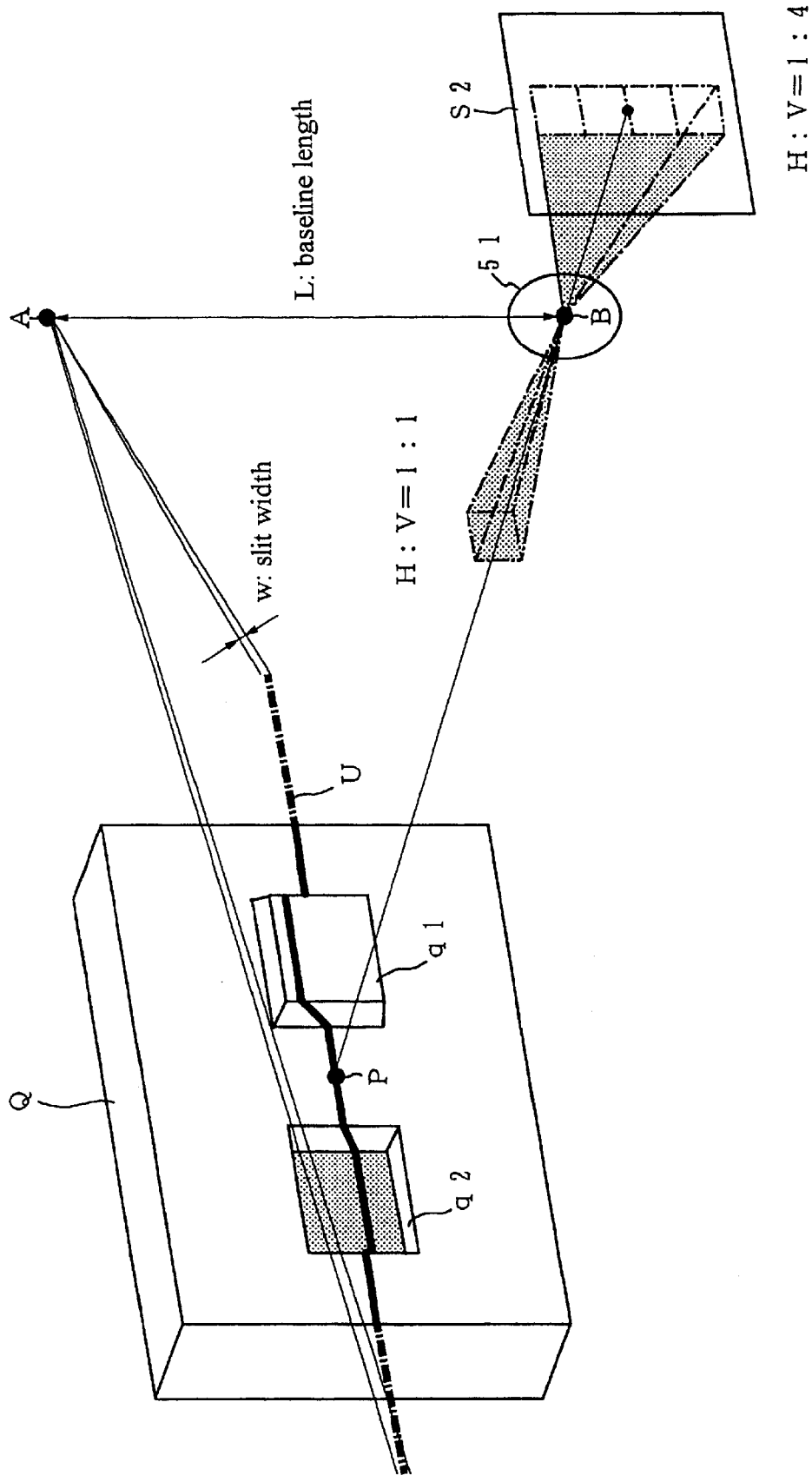
FIG. 6 is a schematic view of slit light projection and reception.
Figure 7:
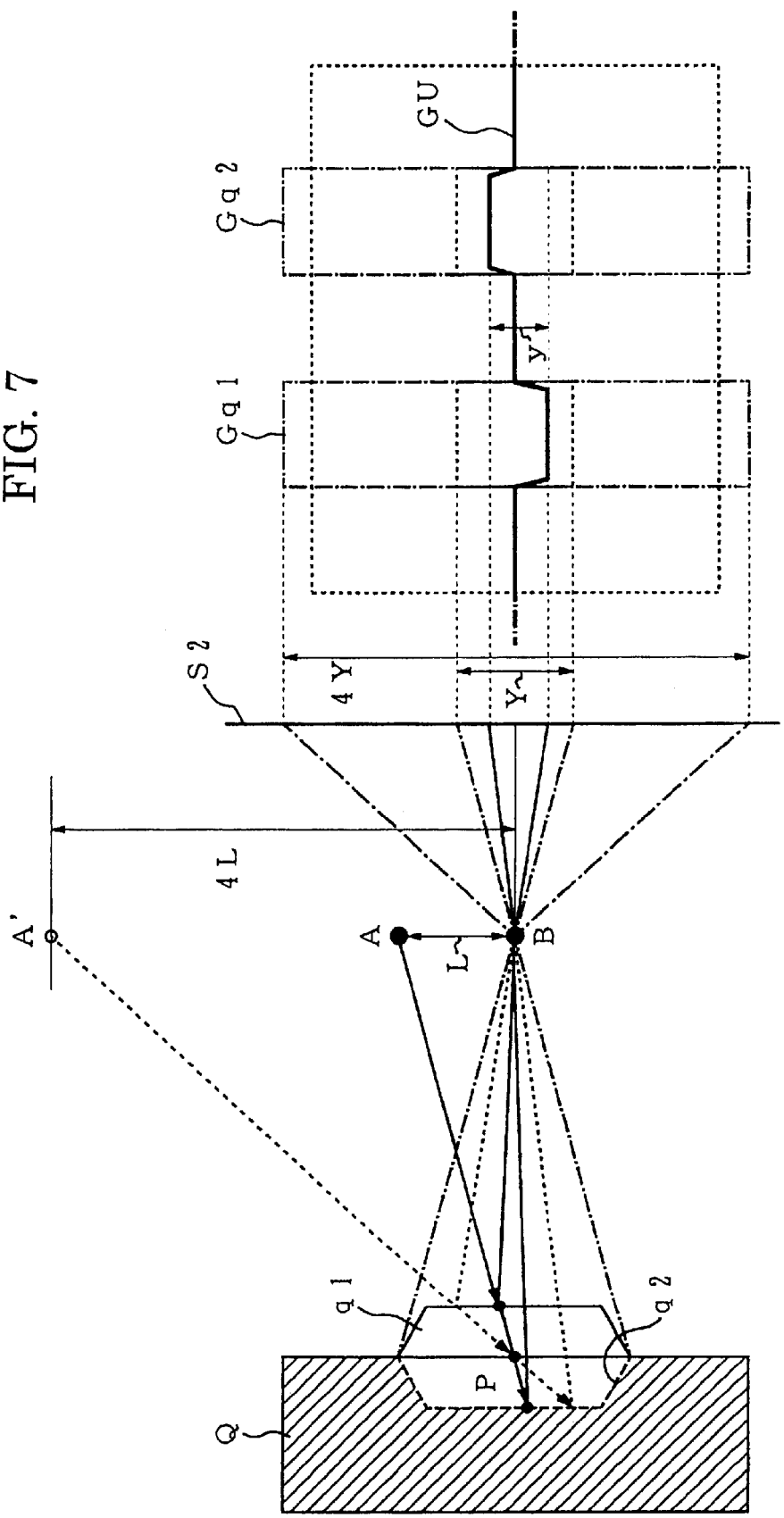
FIG. 7 illustrates the relationship between the baseline length and the photographic image.

FIG. 6 is a schematic view of the slit light projection and reception, and FIG. 7 illustrates the relationship between baseline length and the sensed image.

In FIG. 6, the object Q is an approximately rectangular object, the front surface of which has a convexity q1 and a concavity q2 arranged horizontally. The shapes of the convexity q1 and the concavity q2 in the object Q are the specific measurement targets, i.e., the shapes to be sensed The slit light U is projected from the starting point A to the object Q, and illuminates a linear band on the front of the object Q. In this state, the object image is formed on the photoreceptive surface S2 by the anamorphic lens unit 51. The length direction of the slit light U is the horizontal direction, and the baseline direction of triangulation is the perpendicular direction. That is, the received light principal point B and the starting point A are aligned in a perpendicular direction. Even if there is offset in the depth direction (direction of received light axis) relative to the two points A and B, accurate three-dimensional coordinates are calculated in consideration of the offset. The device data required for calculation of the two point positions, photoreceptive surface pixel positions, and offset are combined with the measurement data (time barycentre ip) and separately output to the host 3.

In the image formation by the anamorphic lens unit 51, the magnification in the perpendicular direction, i.e., baseline direction, is greater than the magnification in the horizontal direction. That is, the formed image is enlarged in the perpendicular direction compared to a conventional equal magnification image. Although not shown in the drawing, the magnification V in the perpendicular direction is 4× the magnification H in the horizontal direction.

As shown in FIG. 7, the formed bright line GU is curved on the photoreceptive surface S2 in accordance with the protuberance of the illuminated part of the object Q. The variation width y in the perpendicular direction of the bright line GU corresponds to the high/low difference of the convexity q1 and concavity q2 of the object Q. Since the image formation is anamorphic, the dimension 4Y in the perpendicular direction of the images Gq1 and Gq2 of the convexity q1 and the concavity q2 projected on the photoreceptive surface S2 is four times (4×) the dimension Y of an image formed by equal magnification. Similarly, the variation width y of the bright line GU is 4× the value when the image is formed by equal magnification, and this value is the same as when light is projected from the starting point A' separated a distance of 4× the baseline length L from the principal point B. That is, by 1:4 anamorphic image formation, it is possible to measure at a resolution of 1:1 baseline length even when the baseline length is shortened to ¼. If the baseline length L is not reduced, a 4×resolution is obtained compared to equal magnification image formation. Since the width of the bright line GU is also enlarged by anamorphic image formation, a narrow slit light U of width w must be projected even for 1:1 magnification to ensure accuracy of the barycentre calculation.

Figure 8A:
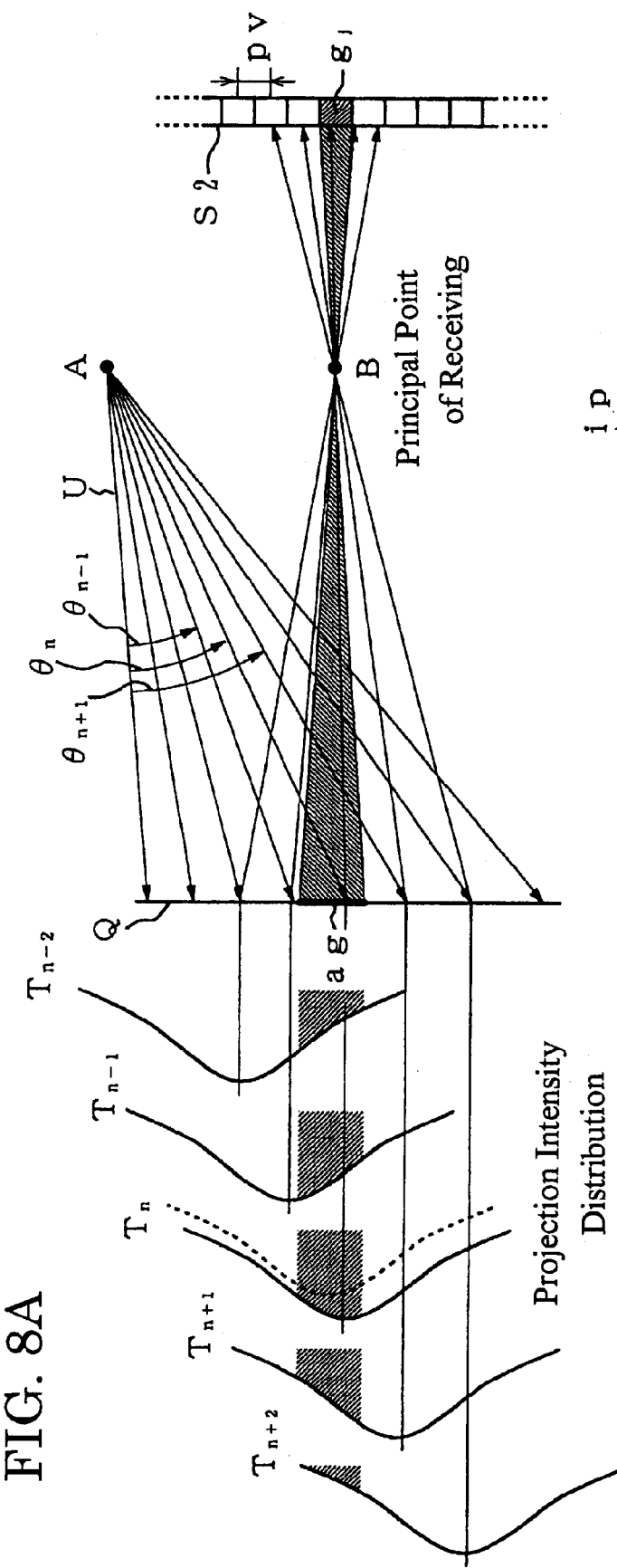
FIGS. 8A and 8B illustrate the principle of calculating the three-dimensional position by the measurement system.
Figure 8B:
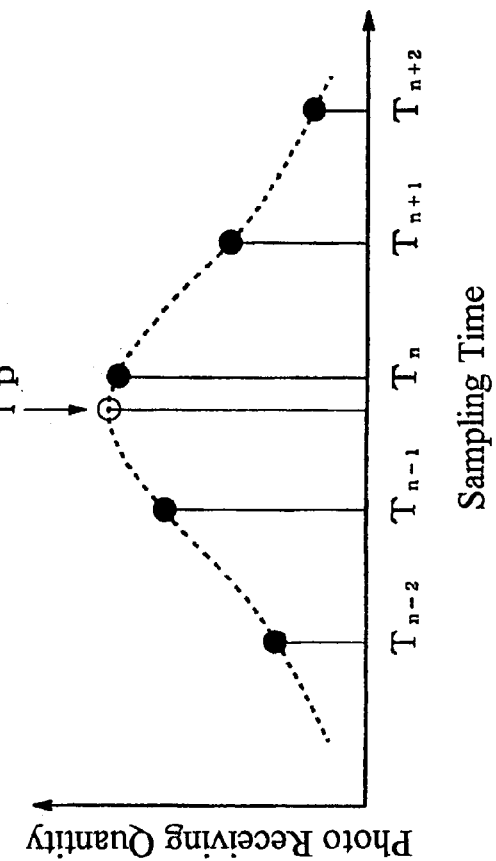

FIGS. 8A and 8B illustrate the principles of calculating the three-dimensional position in the measurement system. To facilitate understanding in the drawings, only five photoreception samplings of each pixel g is shown.

The three-dimensional measurement device 2 projects on the object Q a relatively wide slit light U of several pixels at pitch pv on the photoreceptive surface S2 (image sensing surface) of the image sensor 53. Specifically, the width of the slit light U is approximately five pixels. The slit light U is deflected at uniform angular velocity in a vertical direction in the drawing centered on the starting point A The slit light U reflected by the object Q passes through the image formation principal point B (zoom rear side principal point), and enters the photoreceptive surface S2 of the image sensor 53. Object Q (strictly speaking, a hypothetical surface intersecting the depth direction) is scanned by periodic sampling the amount of light received by each pixel g of the photoreceptive surface S2 during projection of the slit light U. photoelectric conversion signals of 1 frame are output from the image sensor 53 each sampling period When a single pixel g is targeted on the photoreceptive surface S2, in the present embodiment, 32 photoreceptive data are obtained by sampling 32 times during scanning. The time barycentre ip is determined by barycentre calculation performed on the 32 photoreception data. The time barycentre ip is the point in time at which the optical axis of the slit light U passes through the center of the range ag circumscribing the target pixel g on the object surface.

When surface of the object Q is flat such that the characteristics of the optical system produce no noise, the amount of light received by the target pixel g increases in the period during which the slit light U passes as shown in FIG. 8B, and normally transitions to form a normal distribution curve. In the example of FIG. 8B, a maximum amount of light is received between the No. n sample time $T_n$ and the immediately previous (n-1) sample time $T_{n-1}$, and at this point in time, the time barycentre ip matches the calculation result. The incidence angle of the slit light U relative to each pixel g can be unambiguously determined from the positional relationship of the principal point B and each pixel g on the photoreceptive surface S2. Accordingly, the time barycentre is the moment the slit light U enters the principal point B at a specified angle.

The position (coordinates) of the object Q is determined based on the relationship between the illumination direction of the slit light at the determined time barycentre ip, and the incidence direction of the slit light relative to the target pixel. In this way, measurement is possible at a higher resolution than the resolution stipulated by the pixel pitch pv on the photoreceptive surface. The amount of light received by the target pixel g is dependent on the reflectivity of the object Q. However, the relative percentage of light received in a sampling is constant regardless of the absolute amount of light received. Therefore, density object color does not affect measurement accuracy.

Figure 9A:
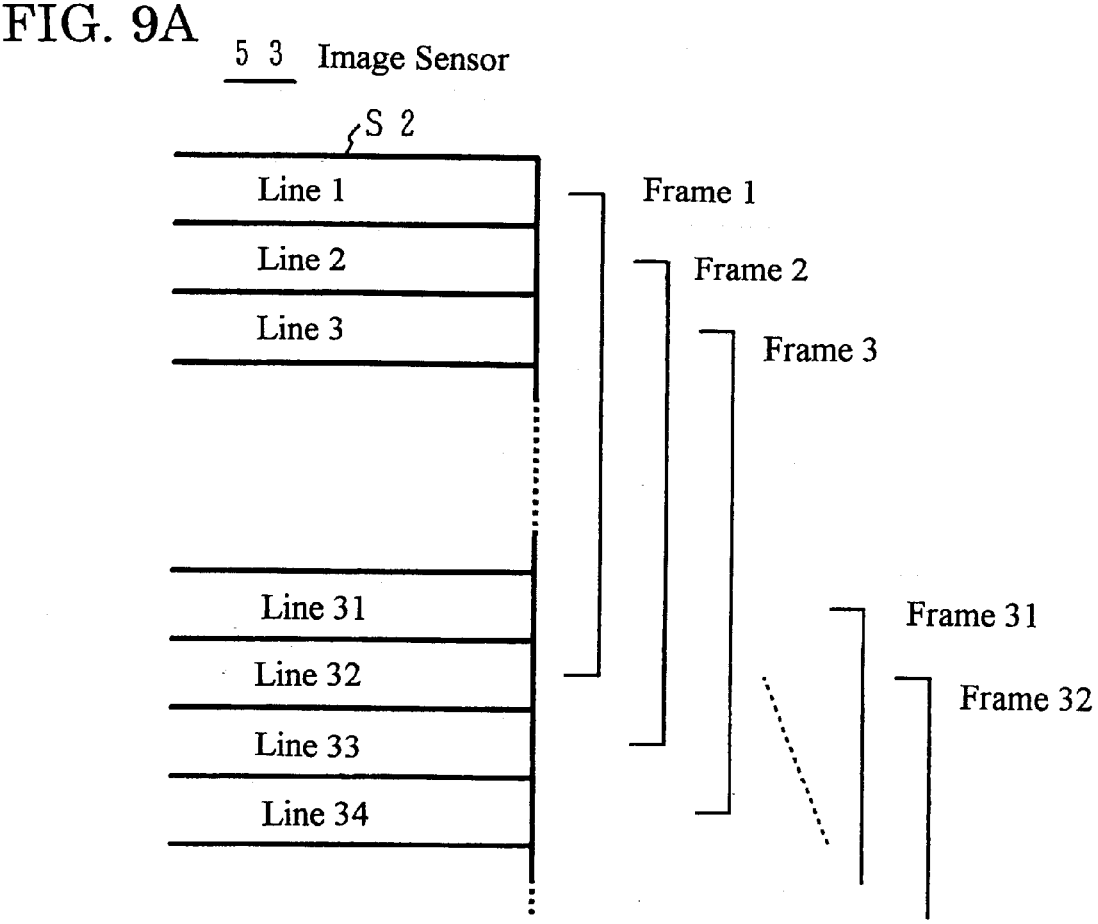
FIGS. 9A and 9B illustrate the relationship between lines and frames on the photoreceptive surface of the image sensor.
Figure 9B:
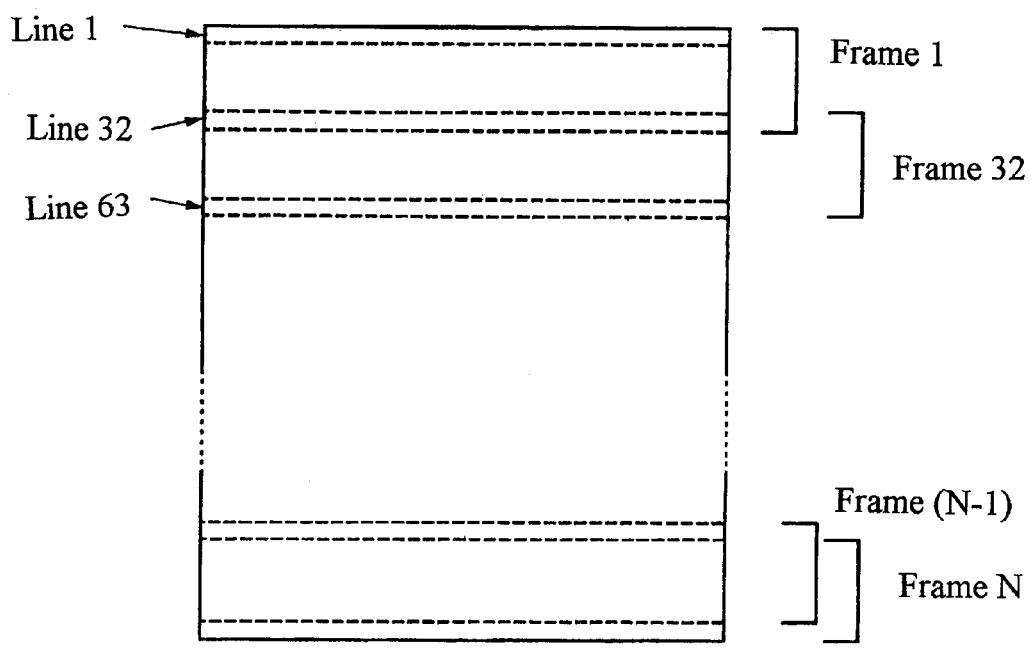

FIGS. 9A and 9B illustrate the relationship between lines and frames on the photoreceptive surface of the image sensor. The readout of one frame from the image sensor 53 is not the entirety of the photoreceptive surface S2, but rather targets only the effective photoreception region of the band-like part in the subscan direction to achieve high-speed sensing. The effective photoreception region is the region in which the bright line is formed representing the protuberance of the object within the measurable distance range, and shifts one pixel for each frame in conjunction with the deflection of the slit light U. The number of pixels in the shift direction of the effective photoreception range is fixed at 32, and the number of pixels in the length direction horizontal direction) may be selectively set at, for example, 200.

As shown in FIGS. 9A and 9B, the photoreception data of 32 lines from the top line of line 1 to line 32 are included in the first frame 1 of the photoreceptive surface S2. The photoreception data sifts one line each frame such that frame 2 includes line 2 to line 33, and frame 3 includes line 3 to line 34. Frame 32 includes the 32 lines from line 32 to line 63.

The photoreception data from frame 1 to frame 32 are sequentially transferred and stored in memory 63 via the signal processing circuit 62. That is, the photoreception data of frames 1, 2, 3, etc. are sequentially stored in the memory 63. The data of the top line 32 in the sampling range are shifted upward 1 line each frame and stored such that the data of frame 1 are stored in line 32, the data of frame 2 are stored in line 32 and the like. When the photoreception data of frame 1 to frame 32 are stored in memory 63, each pixel of line 32 is subjected to time barycentre ip calculation. The photoreception data of frame 33 is transferred to and stored in memory 63 while the calculation is performed for line 32. The photoreception data of frame 33 are stored at the next address after line 32 in memory 63. When the data of frame 33 are stored in memory 63, the time barycentre ip calculation is performed for all pixels of line 33 including frame 2 to frame 33.

Figure 10:
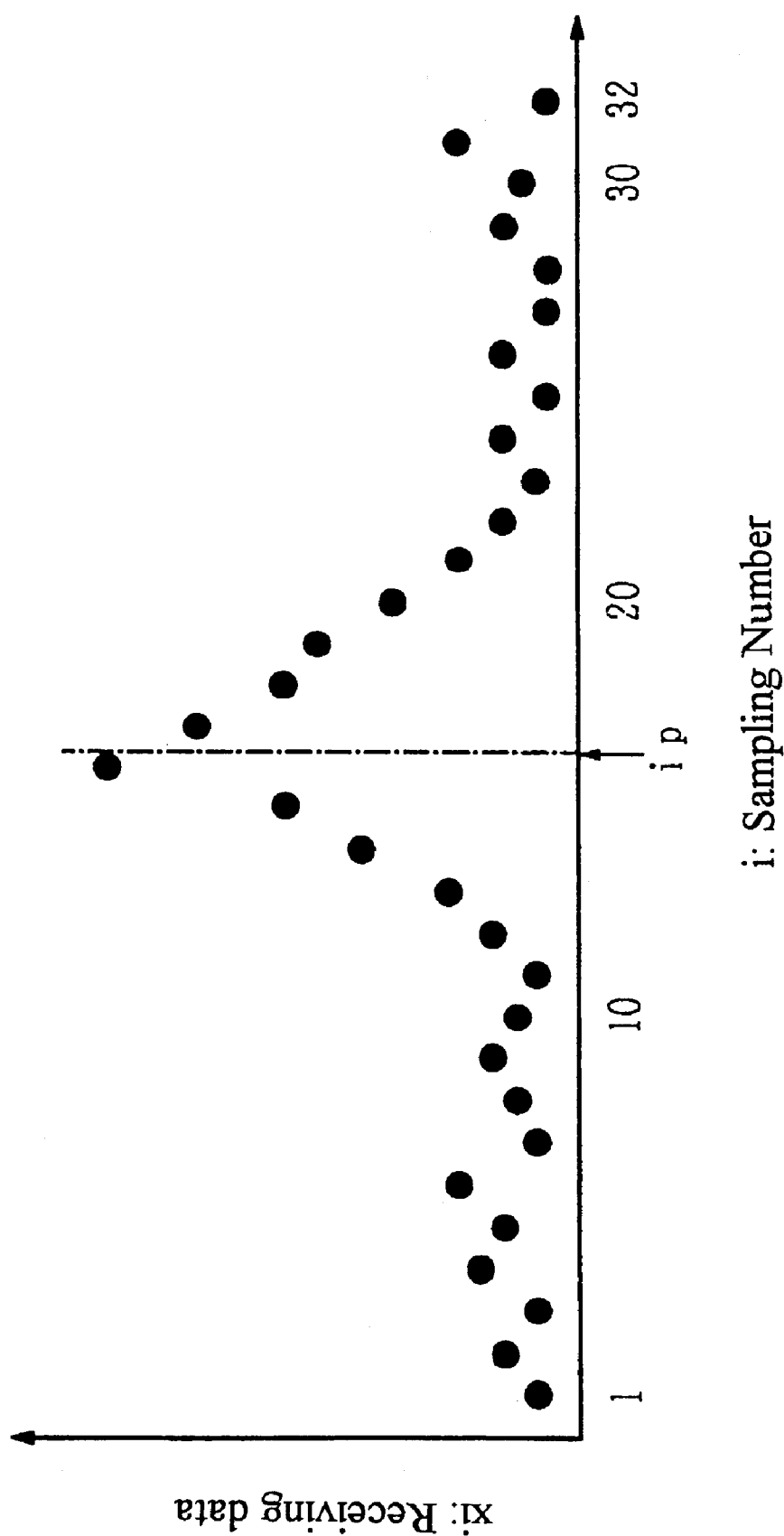
FIG. 10 illustrates the concept of time barycentre.

FIG. 10 illustrates the time barycentre concept.

The time barycentre ip calculated by the barycentred calculation circuit 73 is the weighted center on the time axis in the photoreception data of the 32 individual time series obtained by 32 samplings. A sampling number of 1 to 32 is appended to the 32 photoreception data of each pixel. The No. i photoreception data is represented by xi, where i is an integer of 1 to 32. At this time, i represents the frame number after the pixel enters the effective photoreception range.

The time barycentre ip of the Nos. 1 to 32 photoreception data x1, ..., x32 is determined by dividing the total sum $\Sigma(i \cdot xi)$ of $(i \cdot xi)$ by the total sum $\Sigma xi$ of xi.

The barycentre calculation circuit 73 calculates the time barycentre ip of each pixel based on the data read from the memory 63. The data read from memory 63 are not used directly, but the regular light data are subtracted from these data and the resulting value is used (0 is used when the value is negative). That is, only the regular light data are subtracted from the photoreception data output from the image sensor 53 to provide offset.

The calculated time barycentre ip is sequentially stored in a memory within the display controller, and displayed on the screen of the LCD 21. The value of the time barycentre ip increases when the position on the surface of the object Q is nearer to the three-dimensional camera 2, and is smaller when farther away. Accordingly, the distance distribution of the measurement result can be visualized by displaying a density image using the time barycentre ip of each pixel on the photoreceptive surface S2 as density data.

Although an afocal anamorphic lens is used adjoining a normal lens (perpendicular direction and horizontal direction view angle ratio of 1) in the present embodiment, a simple construction may be used for the anamorphic lens 51B.

The mode of scanning the object Q is not limited to unidirectional deflection of the slit light U inasmuch as (1) a mode of projecting unidirectional slit light and moving the object may be used, (2) a mode of parallel movement of the projection means of the slit light may be used, (3) a mode of rotating an object about an axis parallel to the length direction of the slit light may be used, (4) a mode of rotating the three-dimensional camera around the surroundings of the a mode of bidirectionally deflecting slit light may be used, and (6) a mode of primary deflection of a spot light instead of slit light may be used.

The three-dimensional measurement method is not limited to a light sectioning method of projecting a slit light or a spot light, inasmuch as a spatial pattern encoding method, striped pattern projection method, and stereo viewing method may be used.

The present embodiment increases the use efficiency of the photoreceptive surface by projecting a large object image on the photoreceptive surface even when the front shape of the object is narrow and the depth dimension is small.

Accordingly, occlusion is reduced and the device is rendered more compact since a predetermined measurement resolution is maintained even while shortening the baseline length. Furthermore, the measurement resolution is increased the baseline length is not shortened.

Obviously, many modifications and variation of the present invention are possible in light of the above teachings. It is therefore to be understood that within the scope of the appended claims, the invention may be practiced other than as specifically described.

What is claimed is:

1. A three-dimensional measurement method for measuring position of an object via triangulation, comprising the following steps of:

forming an image of the object on a sensor by an anamorphic lens arranged between the object and the sensor, wherein a magnification of the image in a direction along a baseline of triangulation is greater than a magnification of the image in another direction, different from the direction along the baseline of triangulation; and measuring position of the object by triangulating in accordance with data obtained by the sensor.

2. A three-dimensional measurement method as claimed in claim 1, further comprising a step of projecting a reference light to an object, and wherein the sensor receives a reflected reference light from the object.

3. A three-dimensional measurement method as claimed in claim 2, wherein the reference light has a slit-like shape.

4. A three-dimensional measurement method as claimed in claim 2, wherein the projecting is performed while a projecting direction changes.

5. A three-dimensional measurement method as claimed in claim 1, wherein the anamorphic lens cooperates with a focusing lens in forming an image of an object.

6. A three-dimensional measurement device, comprising:
a projector for projecting reference light from a starting point to an object;

a sensor for receiving the reference light reflected by the object at a position separated from the starting point in a baseline direction;

an anamorphic lens system which is arranged between a object to be measured and said sensor to form an image on a photoreceptive surface of the sensor, wherein a magnification in the baseline direction is greater than a magnification in another direction, different from the baseline direction; and a data output device for outputting data identifying a position of the object in accordance with data related to the object obtained from the sensor output.

7. A three-dimensional measurement device as claimed in claim 6, further comprising a focusing lens system, and a receiving optical system comprises the anamorphic lens system and the focusing lens system.

8. A three-dimensional measurement device as claimed in claim 6, wherein the projector projects a slit-like shaped light.

9. A three-dimensional measurement device as claimed in claim 8, wherein the starting point and the sensor are arranged in a direction along a longitudinal direction of the slit.

10. A three-dimensional measurement device as claimed in claim 6, wherein the projector projects a reference light while a projecting direction changes.

11. A three-dimensional measurement device as claimed in claim 6, further comprising a controller for controlling a relative positional relation between a projecting direction and a position of an object.

12. A three-dimensional measurement device as claimed in claim 6, wherein the projector projects a spot-shaped light.

* * * * *